United States Patent [19]

Kobayashi

[11] Patent Number: 5,283,871
[45] Date of Patent: Feb. 1, 1994

[54] ROUTING SYSTEM FOR ACCESSING REMOTE NODE IN NETWORK FROM CRAFTMAN'S TERMINAL

[75] Inventor: Seiichi Kobayashi, Yokohama, Japan
[73] Assignee: Fujitsu Limited, Kawasaki, Japan
[21] Appl. No.: 614,513
[22] Filed: Nov. 16, 1990

[30] Foreign Application Priority Data

Nov. 17, 1989 [JP] Japan ................... 01-297677

[51] Int. Cl.$^5$ .............................................. G06F 15/02
[52] U.S. Cl. ..................................... 395/275; 395/200
[58] Field of Search ............... 364/900; 395/275, 200; 370/11, 13, 14, 16, 29, 32, 58.1, 58.2, 60, 67, 95.3

[56] References Cited

U.S. PATENT DOCUMENTS 4,685,124 8/1987 Smitt ................................ 364/900

FOREIGN PATENT DOCUMENTS 53-148904 12/1978 Japan .
54-133017 10/1979 Japan .
61-273032 12/1986 Japan .
61-273044 12/1986 Japan .
63-62445  3/1988 Japan .
63-74356  4/1988 Japan .
63-316544 12/1988 Japan .

OTHER PUBLICATIONS

SONET Transport Systems: Common Generic Criteria, *Technical Advisory TA-TSY-000253*, Bellcore Communications Research, pp. i–xiii, 1-1 to 10-7, A-1 to E-5, Feb., Issue 4, 1989 Issue 4, 1989.
Operations, Administration, Maintenance and Provisioning—Lower Layer Protocols for Interfaces between Operations Systems and Network Elements, *ANSI*, Dec., 1988.
Operations, Administration, Maintenance and Provisioning—Upper Layer Protocols for Interfaces between Operations Systems and Network Elements: T1M1.5, *ANSI*, Aug., 1988.

*Primary Examiner*—Dale M. Shaw
*Assistant Examiner*—Moustafa Meky
*Attorney, Agent, or Firm*—Staas & Halsey

[57] ABSTRACT

A communication system containing a plurality of node elements. Each node element contains: a main communication unit containing a multiplexer/demultiplexer unit, a management control unit, a data input/output terminal unit, a switch unit, a connection mode control unit, and a link establishing unit. The connection mode control unit connects the data input/output terminal unit to either the management control unit in its own node element or another management control unit in another remote node element, by controlling the switch unit. The link establishing unit establishes a link for the data input/output terminal unit to access the management control unit in another remote node element through an overhead channel between the node elements. When a request for access to the management control unit in its own node element is made from the remote node element, the connection mode control unit connects the data input/output terminal unit in the remote node element, and to the management control unit in its own node element, through the above link and the switch unit.

8 Claims, 20 Drawing Sheets

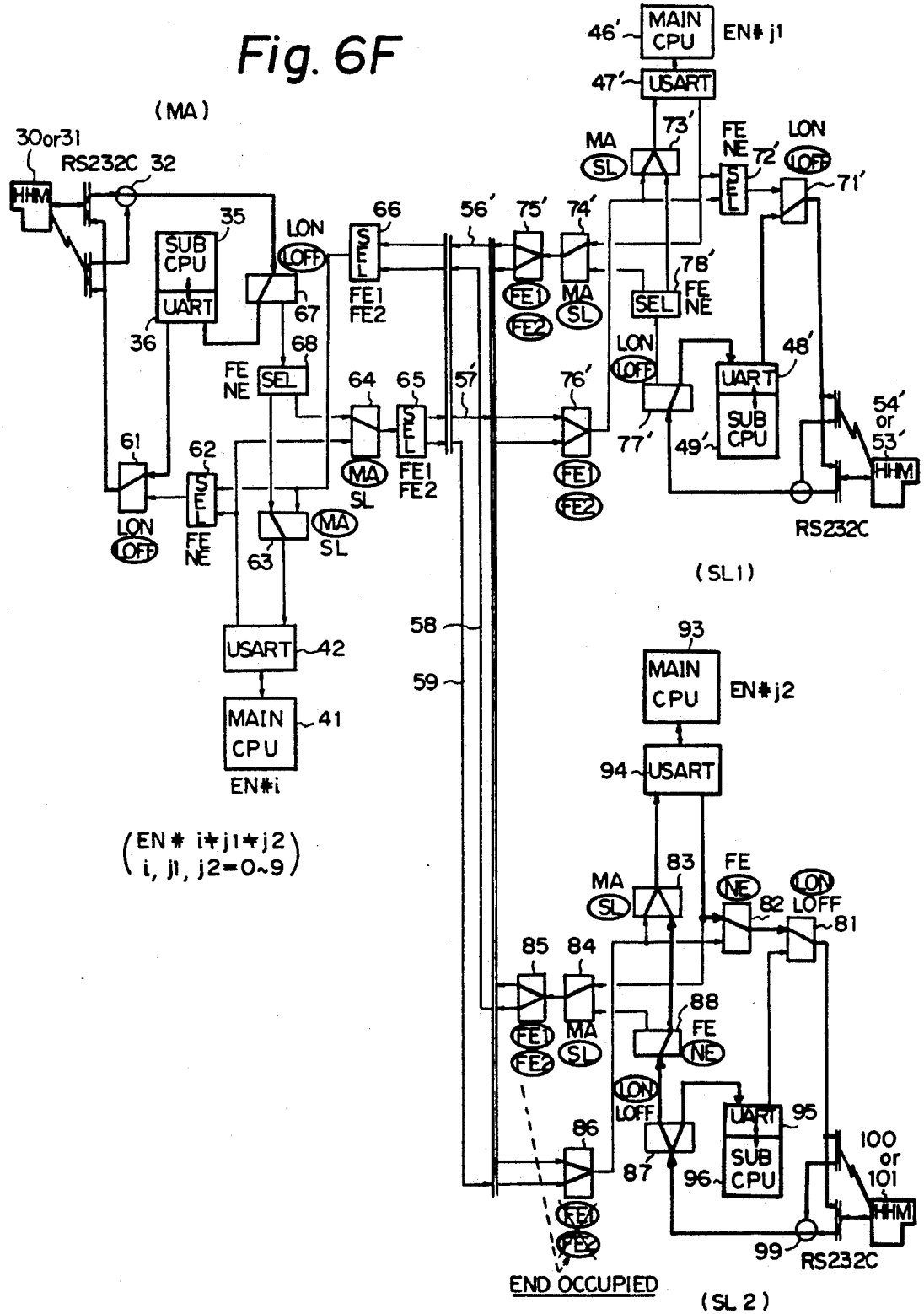

ROUTING SYSTEM FOR ACCESSING REMOTE NODE IN NETWORK FROM CRAFTMAN'S TERMINAL

BACKGROUND OF THE INVENTION (1) Field of the Invention

The present invention relates to a routing system for accessing a node in a communication network from a terminal device which is connected to another node remote from the above node.

In communication networks, a plurality of data transmission stations (nodes), are distributed over a large area, where each station contains, for example, a digital multiplexer, an optical transmission equipment, and the like, and many of those stations are unmanned. For management of the network, it is necessary for a craftsman to collect information on alarms and conditions of any node.

(2) Description of the Related Art

In a conventional communication network, each station contains a management control processor for controlling management operation of the station, and information on alarms and conditions of the station, a data base for holding the information on alarms and conditions of the station, and an interface for connection of a terminal device used by a craftsman, and an access from the terminal device to the data base. Namely, the craftsman can collect the information on the alarms and conditions of the station by connecting a terminal device to the station, and accessing the data base through the terminal device. However, in the conventional communication network, the craftsman cannot access another station remote from the station to which the terminal device is connected. Therefore, it is necessary for a craftsman to go to an unmanned station to collect the information on alarms and conditions of an unmanned station. In addition, when the craftsman goes to the unmanned station for maintaining or restoring the station element in conventional communication network, the craftsman must convey many tools and replacement units to the unmanned station because the craftsman cannot know which tool and replacement unit is necessary for the operation of maintaining or restoring the station element in the network. Therefore, management costs and service costs are high in the conventional communication network. Further, timely monitoring and evaluation of quality of the network service is impossible.

SUMMARY OF THE INVENTION

An object of the present invention is to provide a routing system for accessing a node in a communication network from a terminal device which is connected to another node remote from the above node.

According to the present invention, there is provided a communication system containing a plurality of node elements in the network, and at least one transmission line. The transmission line connects the node elements in the network with each other for transmitting a time-division multiplexed signal therebetween, where the time-division multiplexed signal contains at least one overhead channel. Each of the node elements in the network comprises a main communication unit, a management control unit, a data input/output terminal unit, a switch unit, and a communication control unit. The main communication means is connected to the transmission line, realizes a main function for communication in the node element in the network, and contains a multiplexer/demultiplexer unit. The multiplexer/demultiplexer unit has an input/output port for the above overhead channel. The management control unit monitors and holds alarms and conditions of the main communication unit, and controls the operation of the main communication unit regarding management of the main communication unit. The data input/output terminal unit is operable to access the management control unit in any one of the node elements in the network, where the operation of accessing is initiated by outputting a command requesting the access. The switch unit has first, second, and third contacts, where the first contact is connected to the management control unit, the second contact is operable to connect the data input/output terminal unit thereto, the third contact is connected to the port for the overhead channel in the multiplexer/demultiplexer unit, and the contacts in the switch unit are operable to connect with each other in three connection modes as follows: a first mode in which the second contact is connected to the first contact when the data input/output terminal unit accesses the management control unit in the node element in the network to which the data input/output terminal unit is connected; a second mode in which the second contact is connected to the third contact when the data input/output terminal unit accesses the management control unit in one remote node element of the node elements in the network other than the node element to which the data input/output terminal unit is connected; and a third mode in which the first contact is connected to the third contact when the data input/output terminal unit connected to one remote node element of the node elements in the network other than the node element which contains the switch unit, accesses the management control unit in the node element which contains the switch unit. The communication control unit is operable to be connected to the data input/output terminal unit which is connected to the node element which contains the communication control unit, and is connected to the above port for the overhead channel in the multiplexer/demultiplexer unit. The communication control unit comprises: a connection mode control unit for controlling the connection modes in the switch unit according to the command from the data input/output terminal unit which is connected to the node element which contains the communication control unit, or according to a command from other data input/output terminal unit which is connected to one remote node element of the node elements in the network other than the node element which contains the communication control unit; and a link establishing unit for establishing a communication link between the third contact in the node element which contains the link establishing unit, and another third contact in one remote node element of the node elements in the network. When the connection mode control unit receives a command for requesting an access to the management control unit in the node element which contains the communication control unit, from the data input/output terminal unit which is connected to the node element which contains the communication control unit, the communication control unit makes the switch unit within the node element connect its second contact with its first contact so that the data input/output terminal unit can access the management control unit within the node element. When the connection mode control unit receives a command requesting access to another management control unit, from the data input/output terminal unit which is connected to the node element which contains the communication control unit, where the other management control unit belongs to one remote node element of the node elements in the network other than the node element which contains the communication control unit, the connection mode control unit makes the switch unit within the node element connect the second contact with the third contact so that the data input/output terminal unit can be connected to the port for the overhead channel in the multiplexer/demultiplexer unit. The link establishing unit sends a control signal to another connection mode control unit in the remote node element to make the switch unit in the remote node element, connect its first contact with its third contact so that the data input/ouput terminal unit can access another management control unit in the remote node element through the switch unit in the node element to which the data input/output terminal unit is connected, the multiplexer/demultiplexer unit in the node element to which the data input/output terminal unit is connected, the overhead channel in the transmission line, the multiplexer/demultiplexer unit in the remote node element, and the switch unit in the remote node element.

BRIEF DESCRIPTION OF THE DRAWINGS

In the drawings:

FIGS. 6A to 6F are diagrams showing possible paths for transmitting the management information between three nodes in various selection modes, in the second embodiment;

DESCRIPTION OF THE PREFERRED EMBODIMENTS (1) Basic Operations of First and Second Aspects of the Present Invention Before describing the preferred embodiment of the present invention, first, the basic operations of the various aspects of the present invention are explained below.

Figure 1:
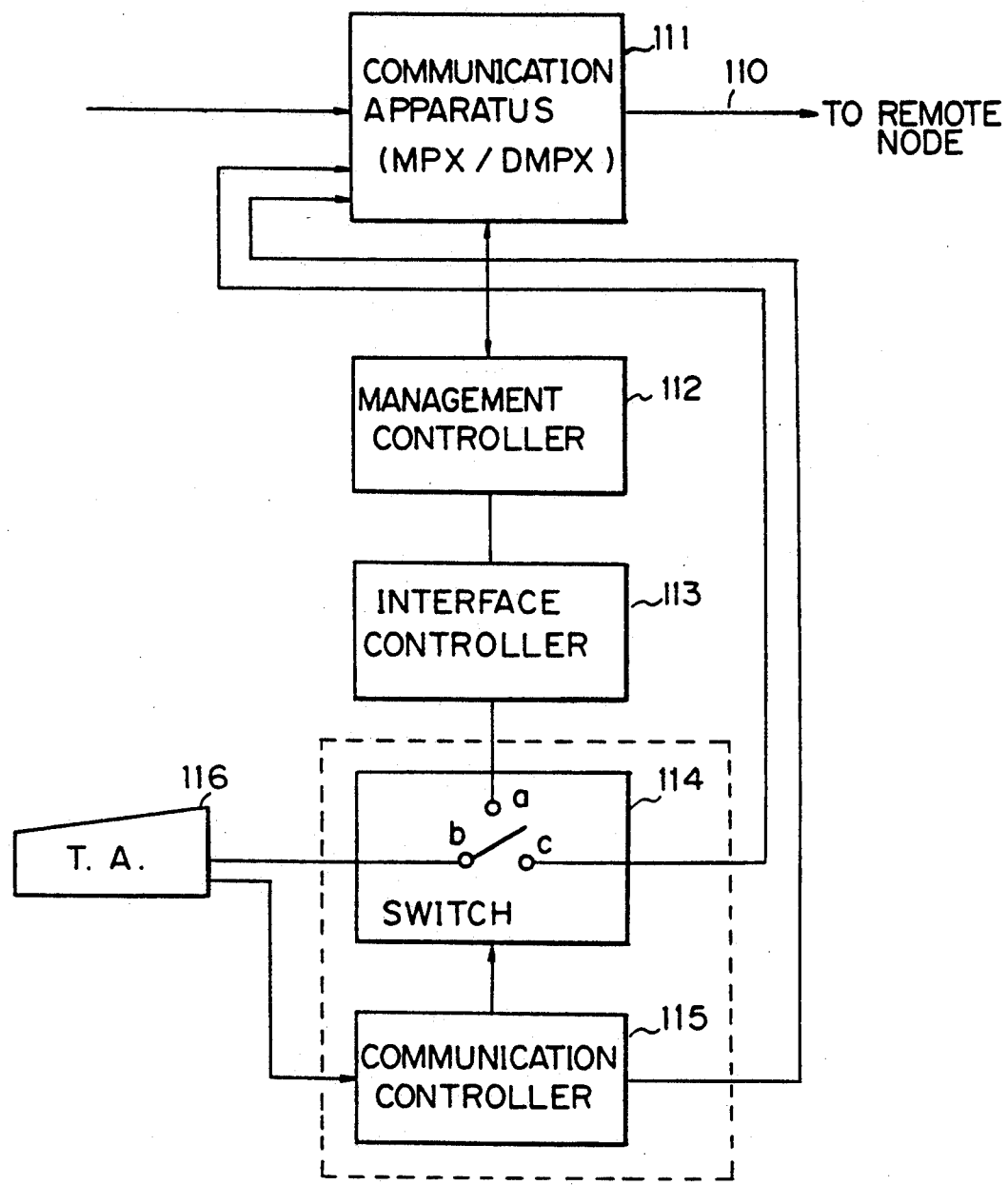
FIG. 1 is a block diagram showing a basic construction of a node element in the network according to the present invention.

FIG. 1 is a block diagram showing a basic construction of a node element in the network according to the present invention. In FIG. 1, reference numeral 110 denotes a transmission line, 111 denotes a communication apparatus which is subject to monitoring and management, 112 denotes a management controller, 113 denotes an interface controller, 114 denotes a switch, 115 denotes a communication controller, and 116 denotes a terminal device.

The management controller 112 monitors and holds the alarms and conditions of the communication apparatus 111, and controls the operation of the communication apparatus 111 regarding the management of the communication apparatus 111. The communication apparatus 111 is connected to the transmission line 110, realizes a main function of the node element, contains a multiplexer/demultiplexer, and is subject to monitoring and management operations by the management controller 112. The interface controller 113 can be connected between the management controller 112 and a first contact a of the switch 114 to function as an interface between the management controller 112 and the terminal device 116 connected to the node element. The interface controller 113 can be connected between the management controller 112 in the same node and a terminal device connected to another node element in the network. The terminal device 116 can be connected to a second contact b of the switch 114, to collect the information on alarms and conditions of the communication apparatus 111, and control the communication apparatus 111 through the management controller 112 for management of the communication apparatus 111. The switch 114 has three contacts a, b, and c including the above first and second contacts a, b and a third contact c, where the first and second contacts a, b are connected as above, and the third contact c is connected to a predetermined channel in the communication apparatus 111. The contacts a, b, and c can be connected in three connections modes. The second contact b is connected to the first contact a when the terminal device 116 accesses the management controller 112 in the node element. The second contact b is connected to the third contact c when the terminal device 116 accesses (the management controller 111) another node element in the network, and the first contact a is connected to the third contact c when the terminal device connected to another node element in the network accesses the management controller 112 in the node element.

The communication controller 115 controls the above connection modes in the switch 114 according to a connection request command from the terminal device 116 connected to the node element, or from a terminal device connected to another remote node element in the network. When the communication controller 115 receives a request to access the management controller 112 in the node element from the terminal device 116 which is connected to the node element, the communication controller 115 makes the switch 114 connect the second contact b with the first contact a so that the terminal device can access the management controller 112.

When the communication controller 115 receives a request to access the management controller in another remote node element in the network from the terminal device 116 which is connected to the node element, the communication controller 115 makes the switch 114 connect the second contact b with the third contact c so that the terminal device can access the predetermined channel in the communication apparatus 111. The communication controller 115 sends a control signal to a communication controller in the remote node element to make the switch in a remote node element in the network to which node element the terminal device 116 is requesting to access, connect its first contact a with its third contact c. Thereby the terminal device 116 can access the management controller in the remote node through the switch 114 in the node element to which the terminal device 116 is connected, the communication apparatus 111 in the node element to which the terminal device 116 is connected, the transmission line 110, the communication apparatus in the remote node element, the switch in the remote node element, and the interface controller in the remote node element, where the remote node element has the same construction as shown in FIG. 1. Thus, the terminal device 116 connected to the node element, can collect the information on alarms and conditions of the communication apparatus in the remote node element, and control the communication apparatus in the remote node element, through the management controller in the remote node element for management of the communication apparatus in the remote node element.

The above function for routing to the remote node element can be realized by only adding the switch 114 and the communication controller 115 to the conventional construction of the node element.

(2) First Embodiment

Figure 2:
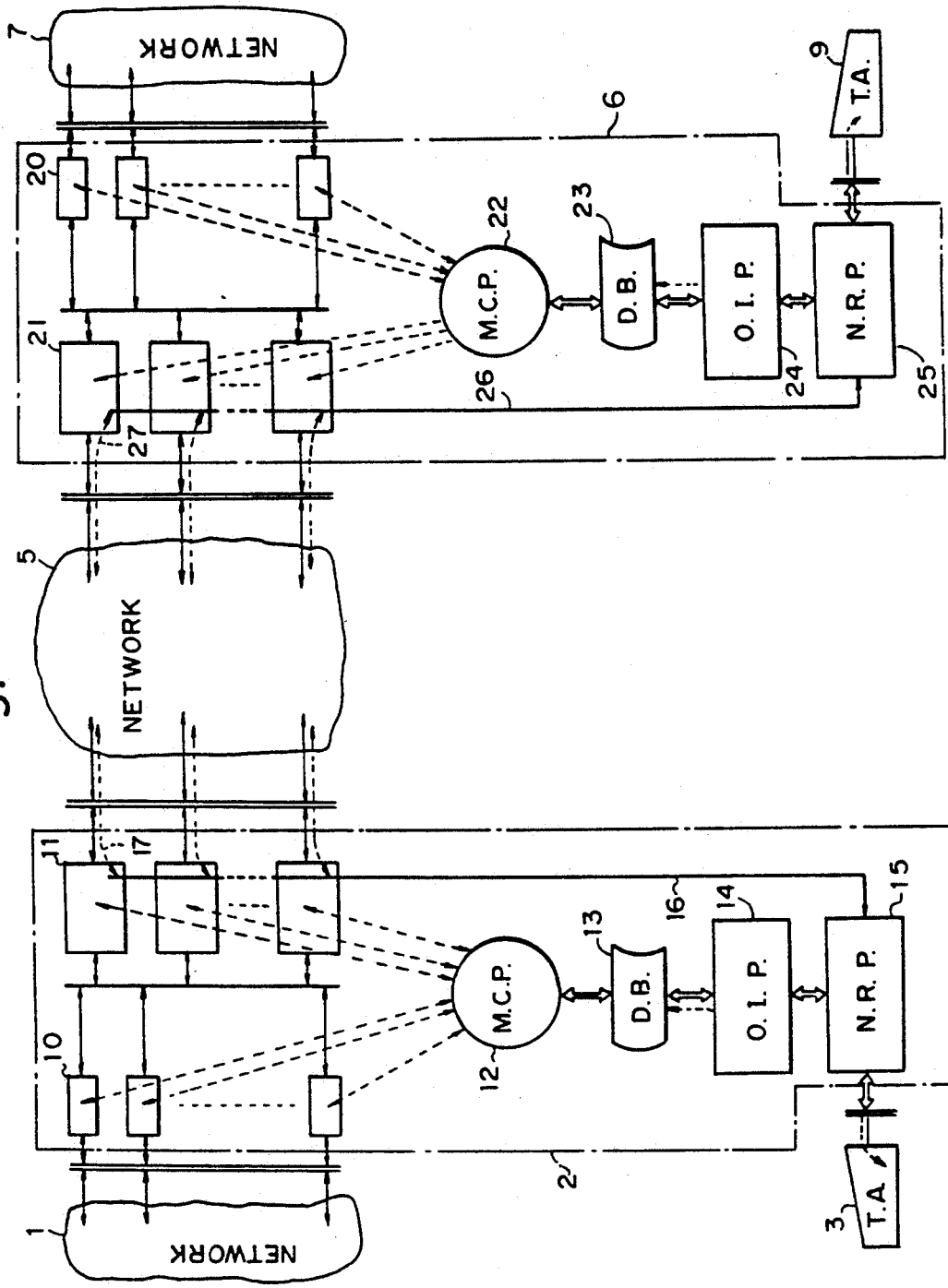
FIG. 2 is a block diagram showing a communication network in which the routing system according to the present invention is included for accessing a node in a communication network from a terminal device which is connected to another node remote from the above node.

FIG. 2 is a block diagram showing a portion of a communication network in which the routing system according to the present invention, is included, and the portion shown in FIG. 2 includes two node elements. In FIG. 2, reference numerals 1 and 7 each denote a lower level network, 2 and 6 each denote a digital multiplexing/demultiplexing element in the network, 3 and 9 each denote a terminal device, 5 denotes a higher level network, 10 and 20 each denote a multiplexer/demultiplexer unit of a lower order, 22 and 12 each denote a management control processor, 13 and 23 each denote a common memory, 14 and 24 each denote an operation interface processor, 15 and 25 each denote a network routing processor, and 16 and 26 each denote a link path. The digital multiplexing/demultiplexing elements 2 and 6 each correspond to the construction of FIG. 1, the network routing processors 15 and 25 each correspond to the communication processor 115 and the switch 114 and FIG. 1, and the operation interface processors 14 and 24 each correspond to the interface controller 113 in FIG. 1, and the management control processor 12 (or 22) and the common memory 13 (or 23), correspond to the management controller 112 in FIG. 1.

A data base containing fundamental information on apparatus provisioning, system management, line testing, and performance monitoring, is constructed in the common memory 13. The management control processor 12 monitors the operations of the multiplexer/demultiplexer units 10 and 11, collects the information on alarms and conditions of the station, and writes the information in the common memory 13, and controls the operations of the multiplexer/demultiplexer units 10 and 11 using the information held in the common memory 13, for example, switches the operation of one of the units from an operating side to a stand-by side.

The operation interface processor 14 functions as an interface between the terminal devices 3 or 9 and the common memory 13. The operation interface processor 14 transforms the information from the terminal device 3 into a data form of the common memory 13, writes the transformed information data in the common memory 13, reads information from the common memory 13, and transforms data form of the information which is read from the common memory 13 into a data form of the terminal device 3.

The network routing processor 15 is provided between the above operation interface processor 14 and the terminal device 3, and is connected to input and output terminals in the multiplexer/demultiplexer units 11 for a predetermined overhead channel.

Figure 3:
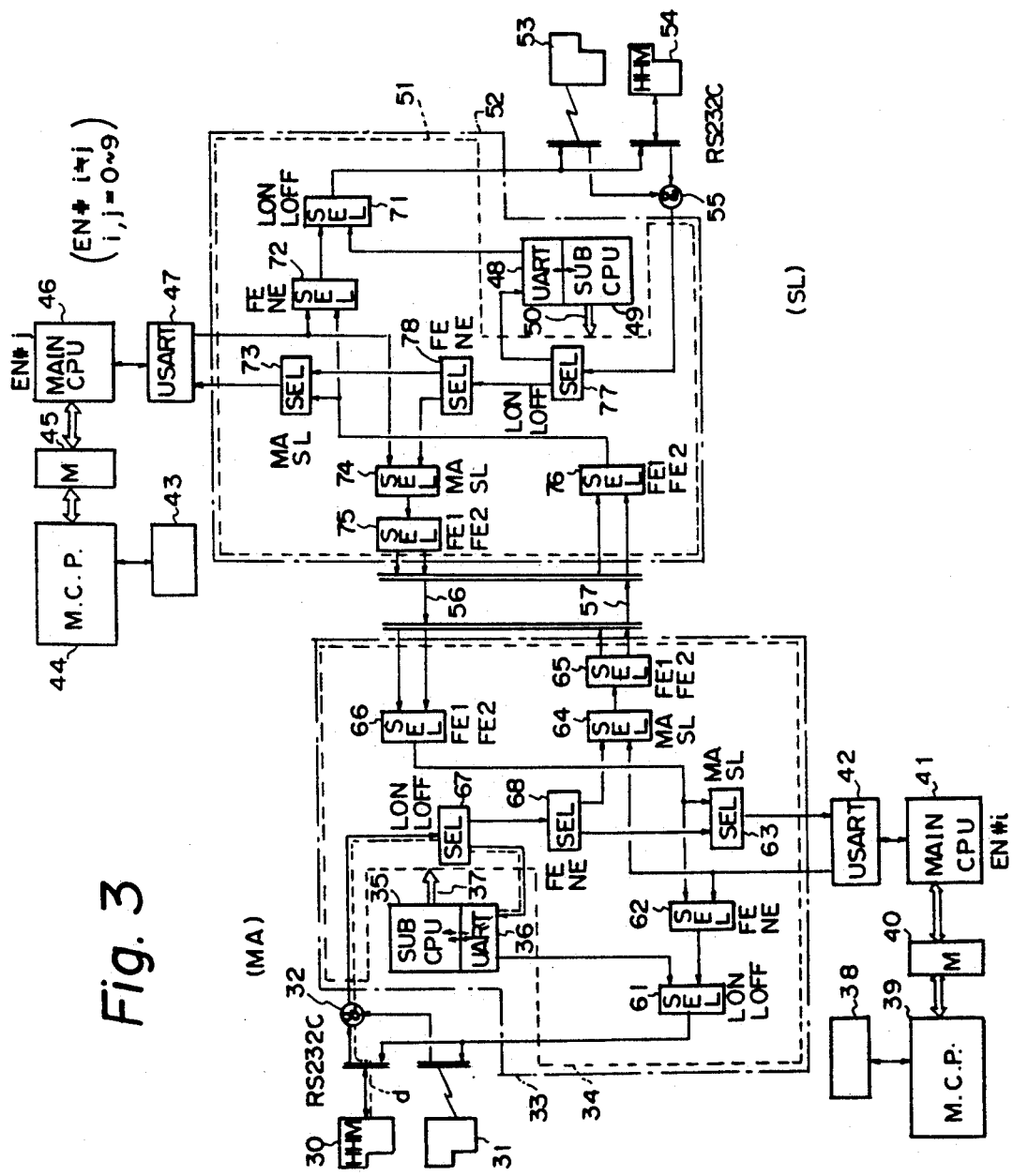
FIG. 3 is a diagram showing an example detailed construction for the network routing processors 15 and 25 in FIG. 2.

FIG. 3 is a diagram showing an example of a detailed construction for the network routing processors 15 and 25 in FIG. 2, and FIG. 3 shows the construction relating to an access operation from a terminal device which is connected to a node element in the network, to another remote node element in the network; for example, from the terminal device 3 to the digital multiplexing/demultiplexing element 6 in FIG. 2, or from the terminal device 9 to the digital multiplexing/demultiplexing element 2. In FIG. 3, reference numerals 30, 31, 53 and 54 each denote a terminal device, 32 and 55 each denote an AND circuit, 33 and 52 each denote a network routing processor, 34 and 51 each denote a switching circuit, 35 and 49 each denote a sub-CPU, 36, 48, 42, and 47 each denote a communication control LSI, 41 and 46 each denote a main CPU, 40 and 45 each denote a memory, 39 and 44 each denote a management control processor, 38 and 43 each denote a portion which is subject to the control of the management control processor 39 or 44, in the digital multiplexing/demultiplexing element 2 or 6, and 56 and 57 each denote a communication path from the network routing processor 52 to the network routing processor 33, and a path from the network routing processor 33 to the network routing processor 52. In the construction of the switching circuits 34 and 51, reference numerals 61, 62, 63, 64, 65, 66, 67, 68, 71, 72, 73, 74, 75, 76, 77, and 78 each denote a selector.

The main CPU 41 and the communication control LSI 42 realizes the operation interface processor 14 in FIG. 2, and the main CPU 46 and the communication control LSI 47 realizes the operation interface processor 24 in FIG. 2. The paths 56 and 57 correspond to paths realized by the link paths 16 and 26, the multiplexer/demultiplexer units 11 and 21 of the higher order, and the predetermined overhead channel in the network 5 in FIG. 2.

The terminal devices 30 and 54 are respectively connected to the corresponding network routing processors 33 and 52 through EIA232 interfaces, and the terminal devices 31 and 53 are respectively connected to the corresponding network routing processors 33 and 52 through a dedicated transmission line using MODEMs. The signals from the terminal devices 30, 31, 53, and 54 are respectively input to the network routing processors 33 and 52 through the AND circuits 32 and 55.

The terminal device 30 sends commands to the sub-CPU 35 through a path shown by a dashed line d in FIG. 3, where the above path d including the selector 67 is held in an idling state. The commands determine the following selection modes: a log-on/log-off selection (LON/LOFF); a far-end/near-end selection (FE/NE); a master/slave selection (MA/SL); and a far-end access path selection (FE1/FE2). Receiving the commands, the sub-CPU 35 controls the selectors 61 to 68 in the switching circuit 34. The above selections are explained later.

Figure 5:
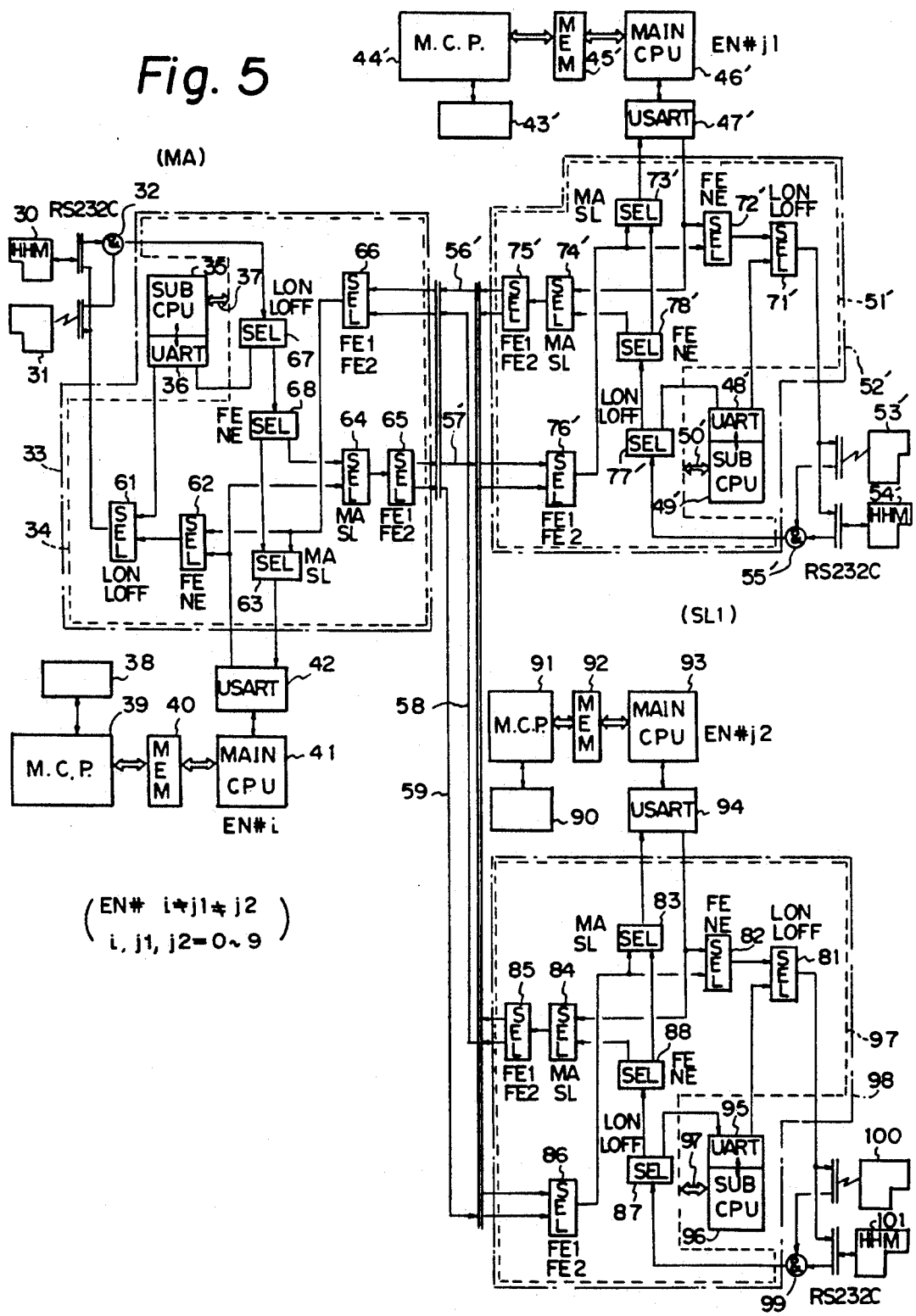
FIG. 5 is a diagram showing the construction relating to an access operation from a terminal device which is connected to a node element which is designated as a master-side node, to two other remote node elements which are each designated as a slave-side node, in the second embodiment.
Figure 7:
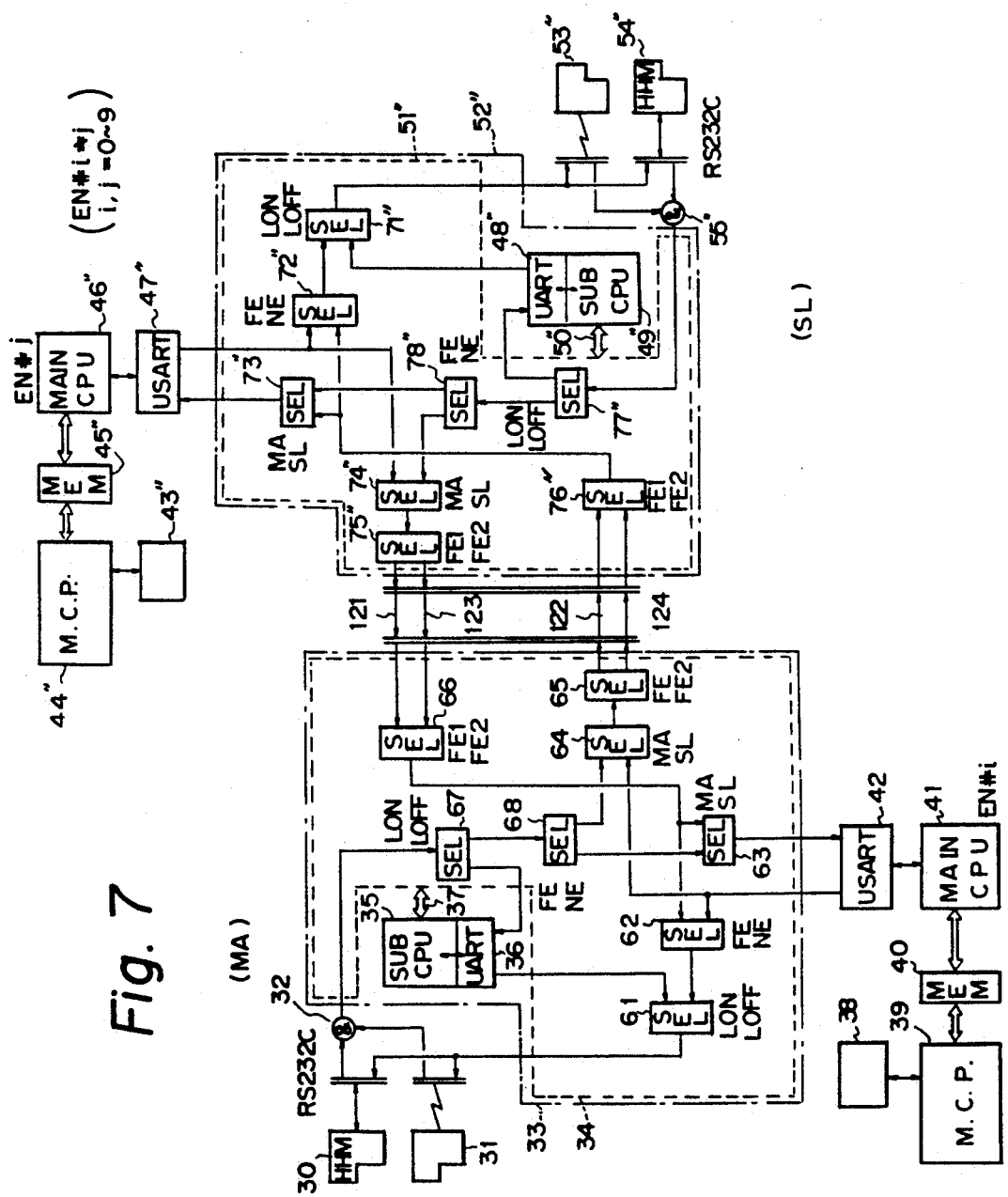
FIG. 7 is a diagram showing the construction relating to an access operation from a terminal device which is connected to a node element which is designated as a master-side node, to another remote node element which is designated as a slave-side node, in the third embodiment.

The far-end/near-end selection (FE/NE) is an operation to select one of a state accessing the main CPU 46 in the remote (far-end) node from the terminal device 30 or 31, and a state accessing the main CPU 41 in the (near-end) node to which the terminal device 30 or 31 is connected, from the terminal device 30 or 31. The master/slave selection (MA/SL) is an operation to select one of a state in which a terminal device is directly connected to a node which is designated as a master-side node, or a state in which a terminal device is directly connected to a node which is designated as a slave-side node. The far-end access path selection (FE1/FE2) is provided for selecting one of two far-end access paths. The two far-end access paths are provided when the constructions as shown in FIG. 5 or FIG. 7 are used.

The sub-CPU 35 sends information on the above command through the communication control LSI 36, the path 57, and the communication control LSI 48, to the sub-CPU 49 in the remote node. Receiving the information, the sub-CPU 49 controls the selectors 71 to 78 according to the information. Then, a link for transmitting management information is established between the sub-CPU's 35 and 49 with aid of the communication control LSI's 36 and 48 in accordance with a predetermined communication protocol, for example, the HDLC procedure.

Each of the selectors 61 to 68, and 71 to 78 in the switching circuits 34 and 51, are respectively switched regarding one of the above-mentioned selection modes (FE/NE), (MA/SL), and (FE1/FE2) as shown for each selector in FIG. 3.

Figure 4A:
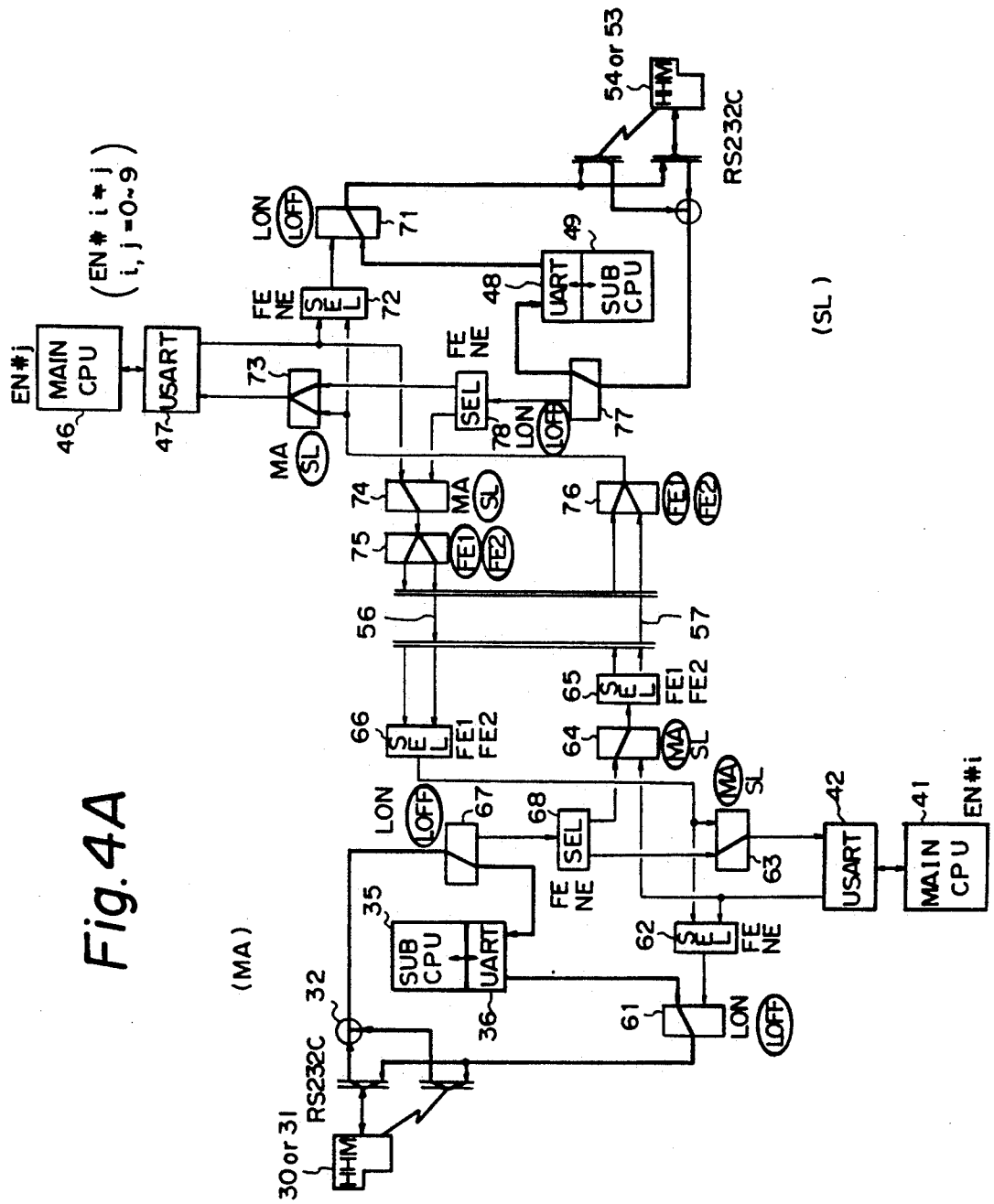
FIGS. 4A to 4D are diagrams showing a possible path for transmitting the management information between the two nodes in various selection modes, in the first embodiment.
Figure 4B:
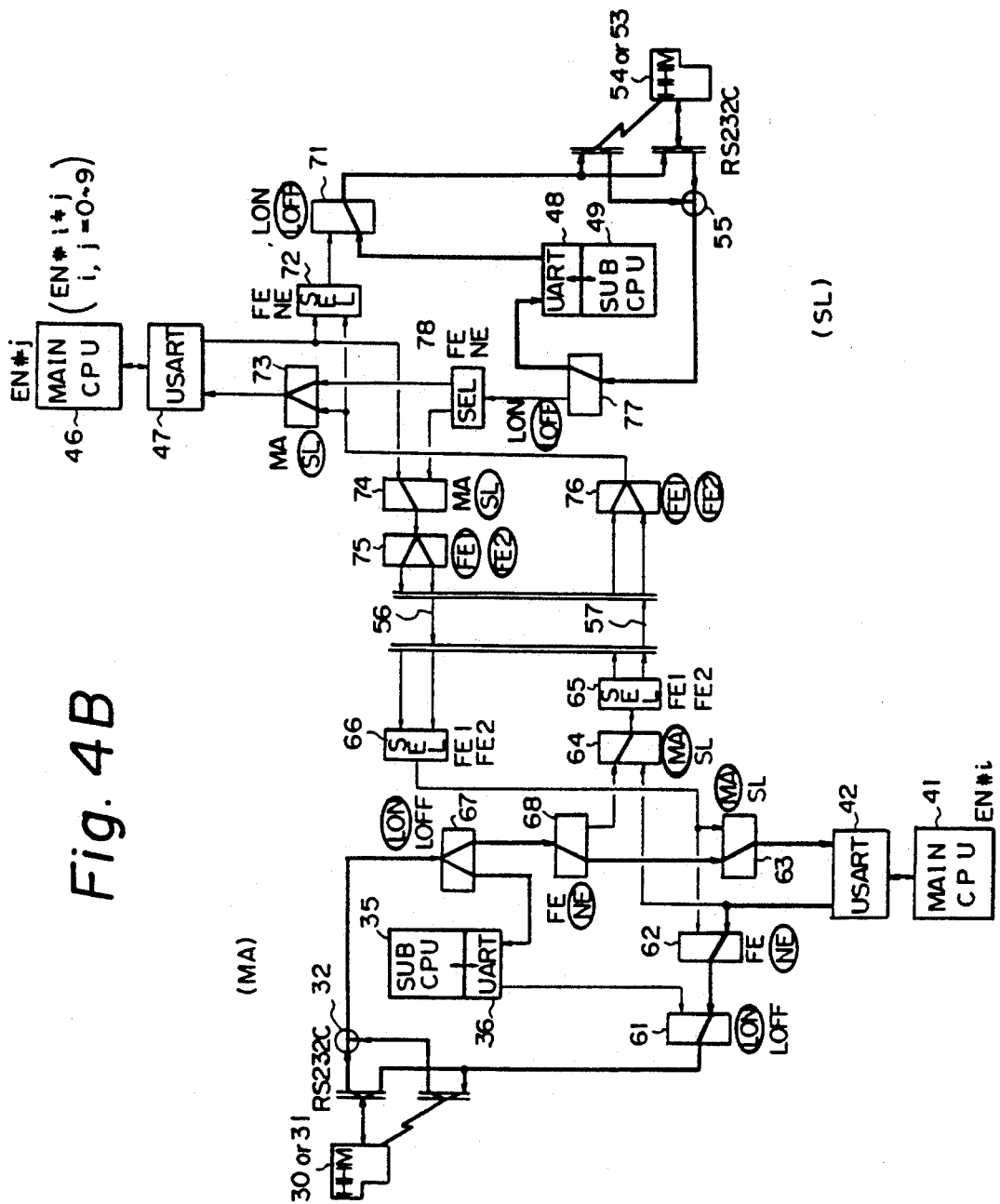
Figure 4C:
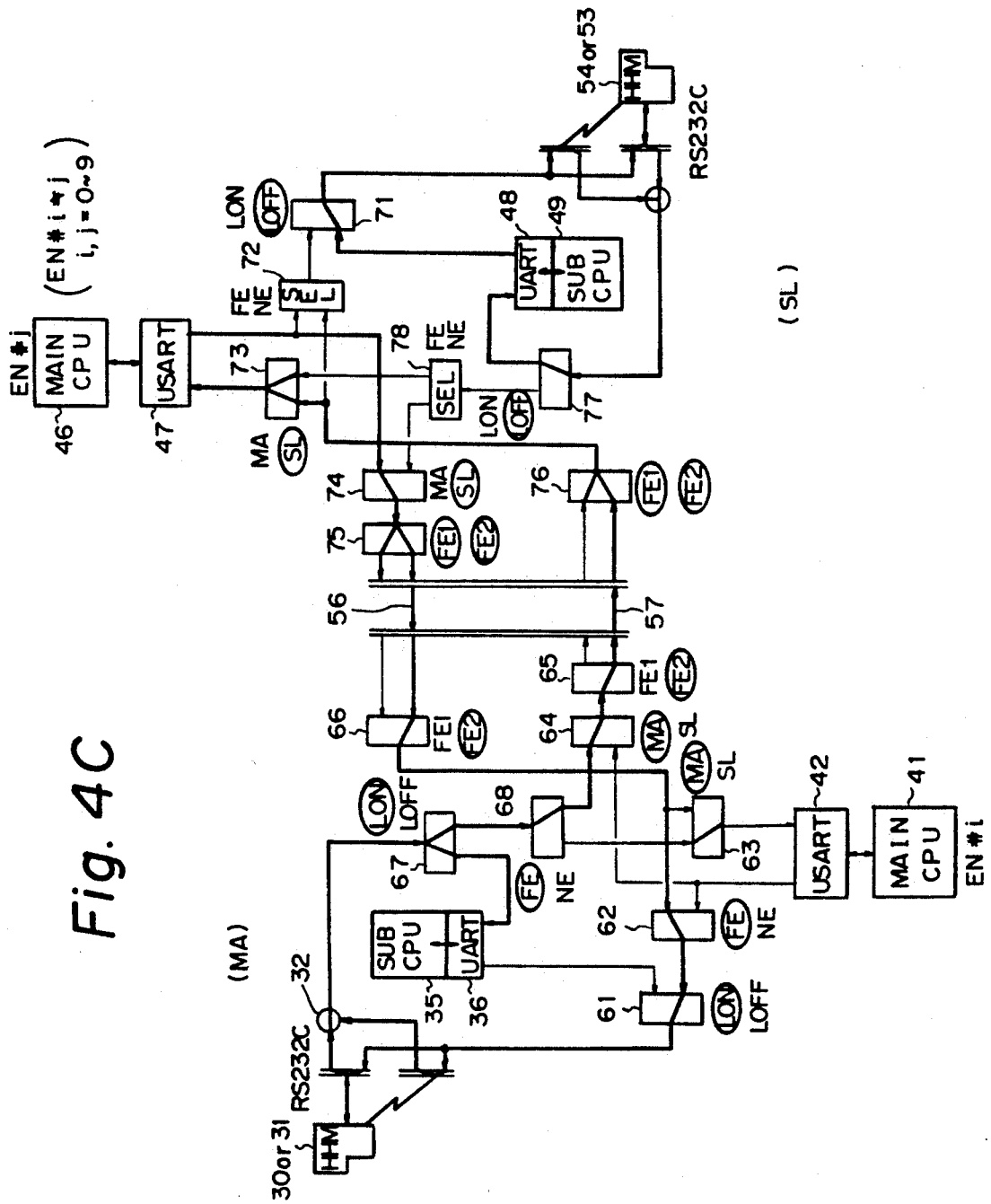
Figure 4D:
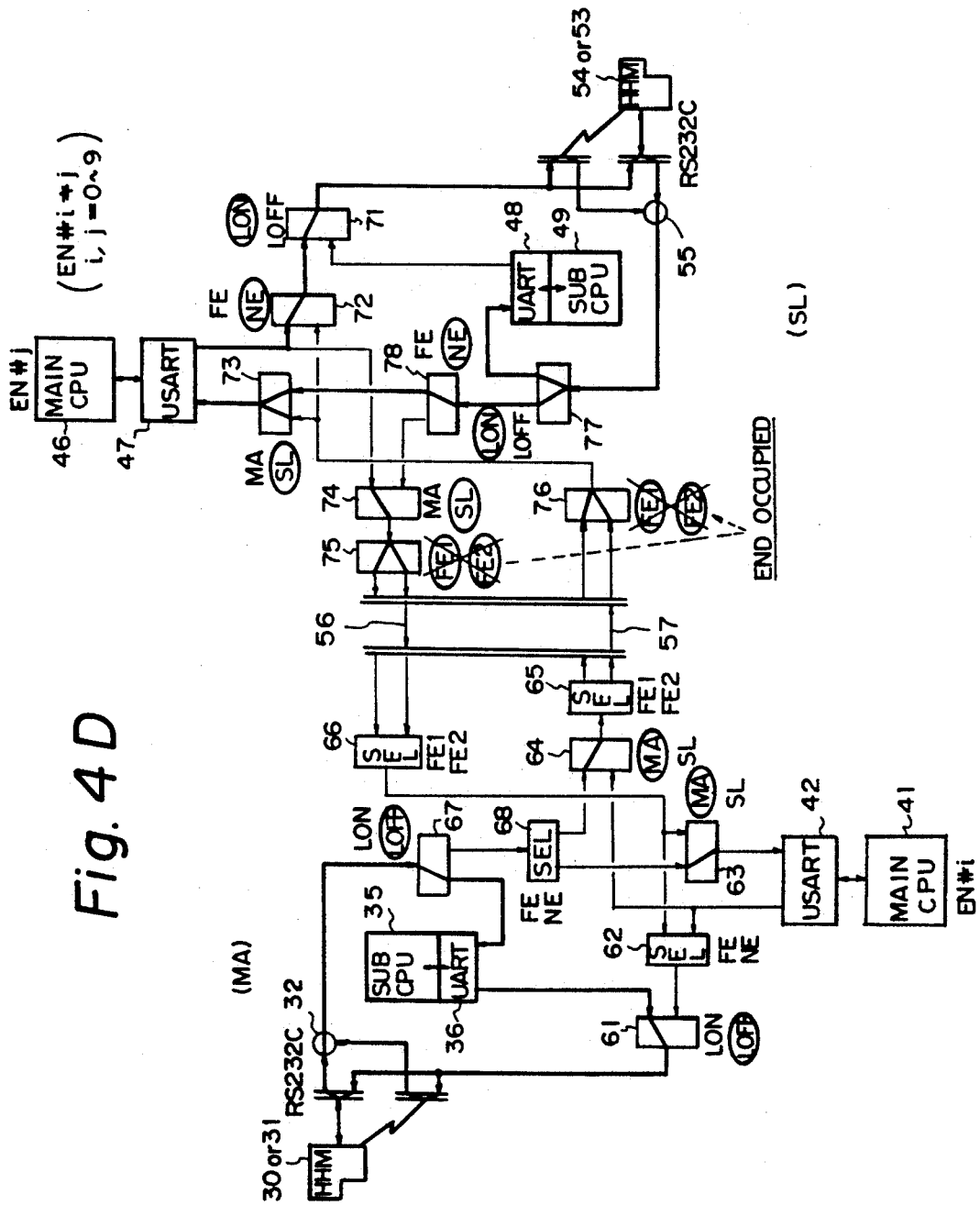

FIGS. 4A to 4D are diagrams showing possible paths for transmitting the management information between the two nodes in various selection modes in the first embodiment, wherein one node element in the network (the digital multiplexing/demultiplexing element 2) is designated as the master node, and the other node element in the network (the digital multiplexing/demultiplexing element 6) is designated as the slave node. In FIGS. 4A to 4D, the above paths are shown by bold lines. FIG. 4A shows a connection in the log-off (LOFF) state; FIG. 4B shows a connection in the state in which the terminal device 30 or 31 designates the node element (the digital multiplexing/demultiplexing element 2) to which the terminal device is connected, as the master-side node, and accesses the node element (the main CPU 41) to which the terminal device is connected; FIG. 4C shows a connection in the state in which the terminal device 30 or 31 designates the node element (the digital multiplexing/demultiplexing element 2) to which the terminal device is connected, as the master-side node, and accesses the remote node element (the main CPU 46) through the paths 57 and 56; and FIG. 4D shows a connection in the state in which the terminal device 53 or 54 designates the node element (the digital multiplexing/demultiplexing element 6) to which the terminal device is connected, as the slave-side node, and accesses the node element (the main CPU 46) to which the terminal device is connected. In the state of FIG. 4D, the terminal device 53 or 54 controls the node element to which the terminal device is connected, in the same manner as the terminal device 30 or 31 does in the case of FIG. 4B, except that the sub-CPU 49 makes the selector 75 output no signal to the master-side node element (the digital multiplexing/demultiplexing element 2), and makes the selector 76 receive no signal from the master-side node element. The above control of the selectors 75 and 76 are shown in an "END OCCUPIED" state in FIG. 4D.

(3) Second Embodiment

FIG. 5 is a diagram showing the construction relating to an access operation from a terminal device which is connected to a node element in the network which is designated as a master-side node, to two other remote node elements in the network which are each designated as a slave-side node. The aforementioned far-end access path selection mode (FE1/FE2) is used to access one of the above two slave-side node elements in the embodiment of FIG. 5. In FIG. 5, reference numeral 33 denotes a network routing processor in the master-side node element, 52' denotes a network routing processor in a first slave-side node element, and 98 denotes a network routing processor in a second slave-side node element, and the construction in each node element in FIG. 5 is the same as the construction shown in FIG. 3. Further, reference numerals 56' and 57' each denote a communication path from the network routing processor 52' to the network routing processor 33, and a path from the network routing processor 33 to the network routing processor 52', and reference numerals 58 and 59 each denote a communication path from the network routing processor 98 to the network routing processor 33, and a path from the network routing processor 33 to the network routing processor 98.

Figure 6A:
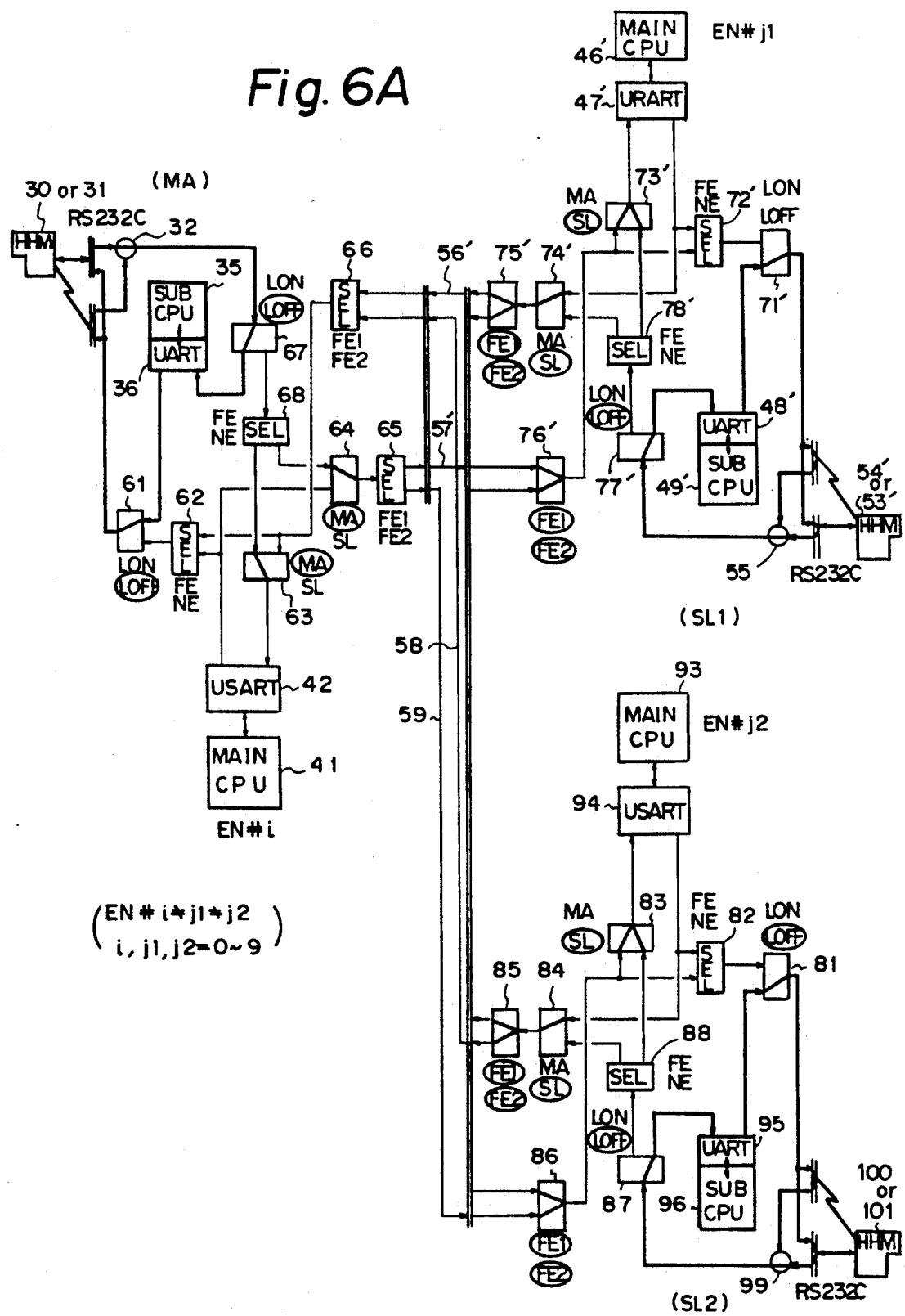
Figure 6B:
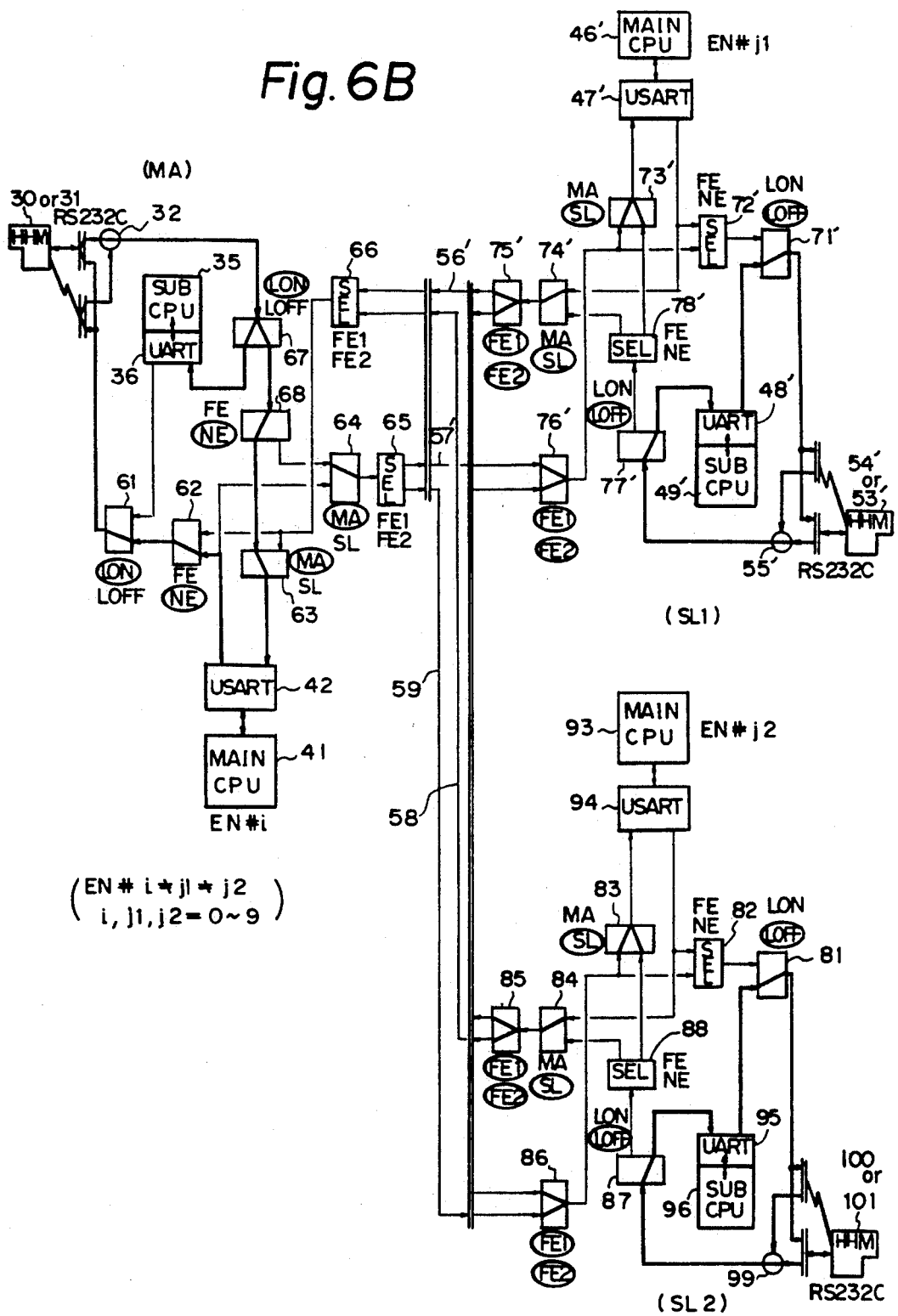
Figure 6C:
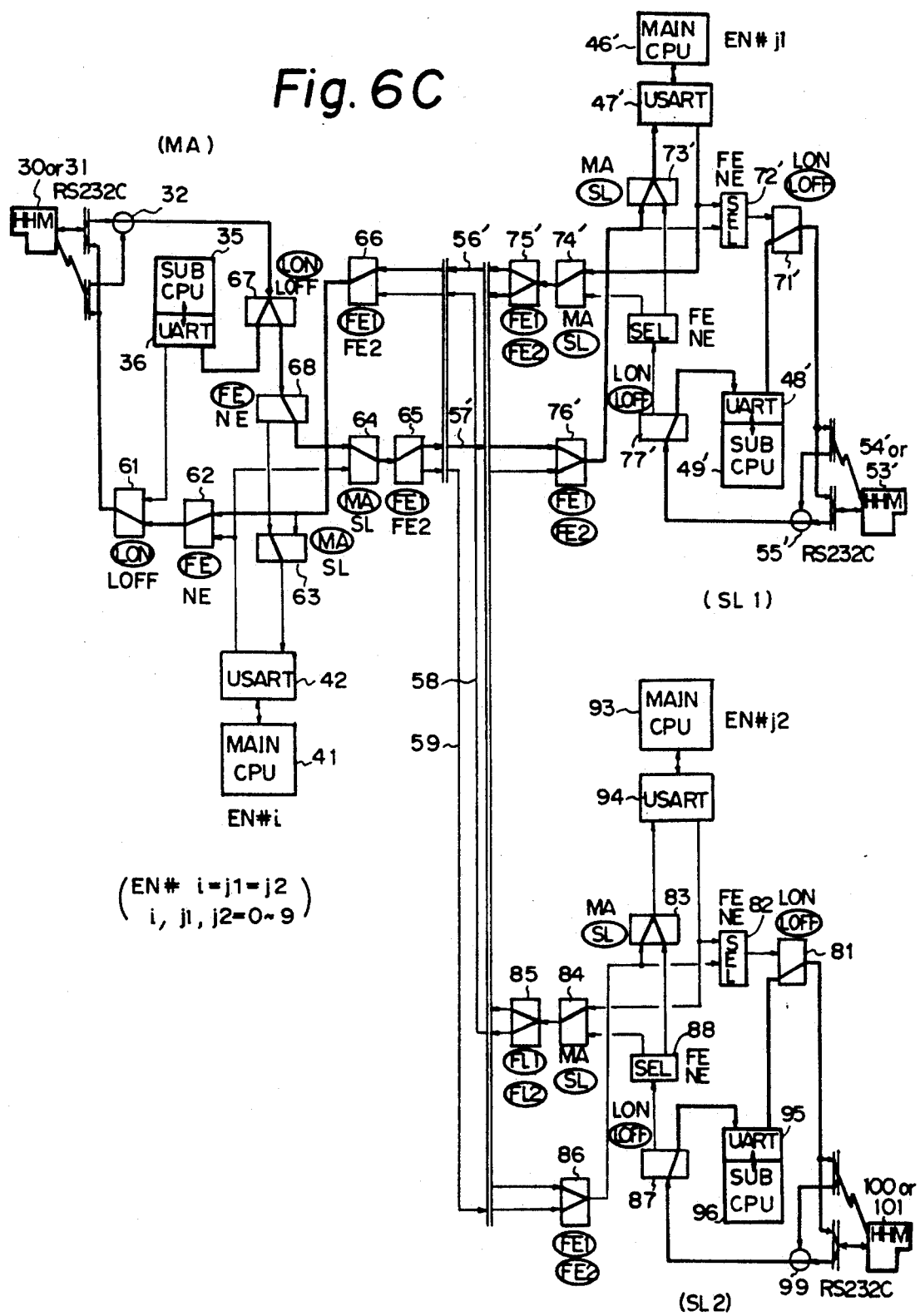
Figure 6D:
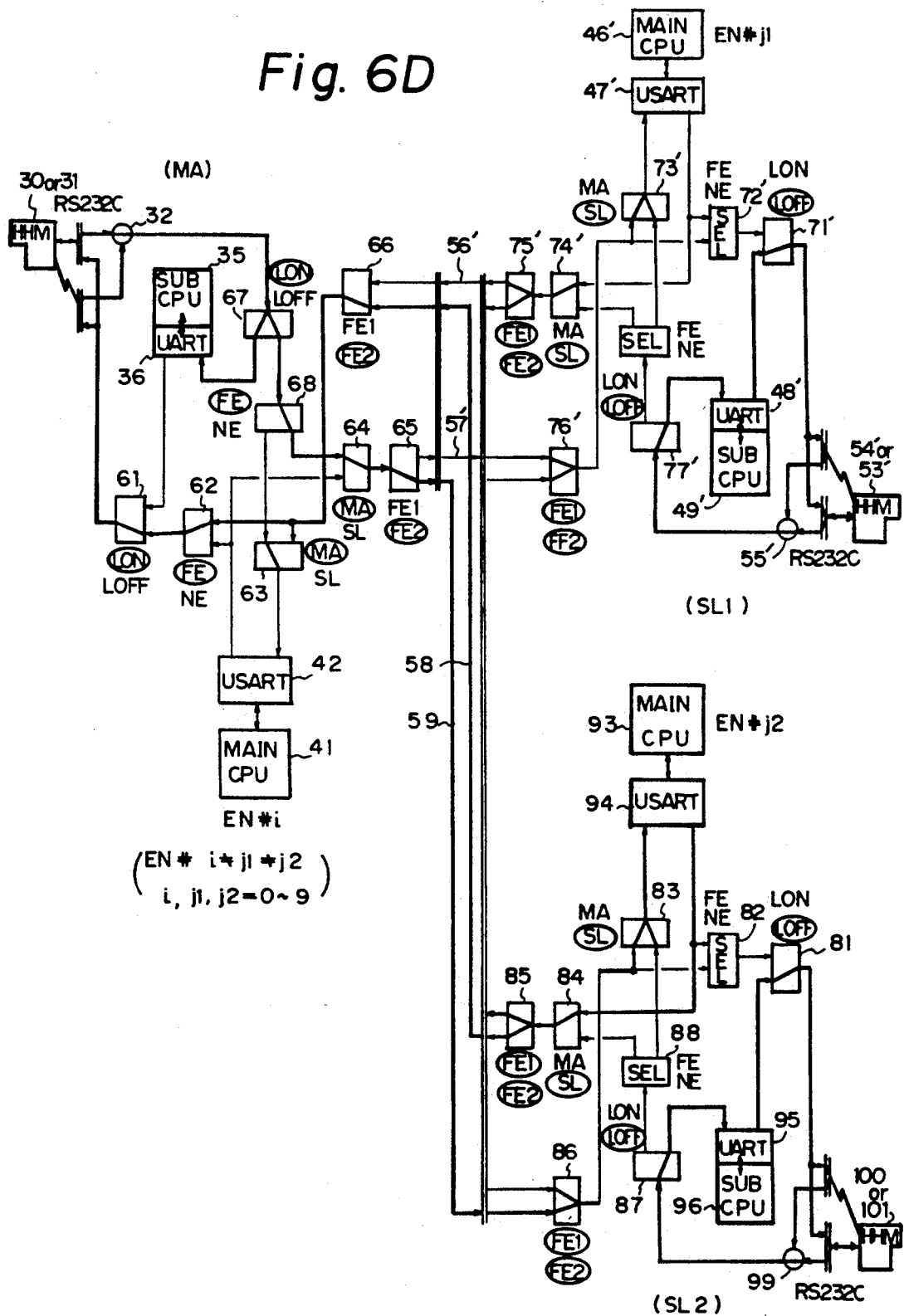
Figure 6E:
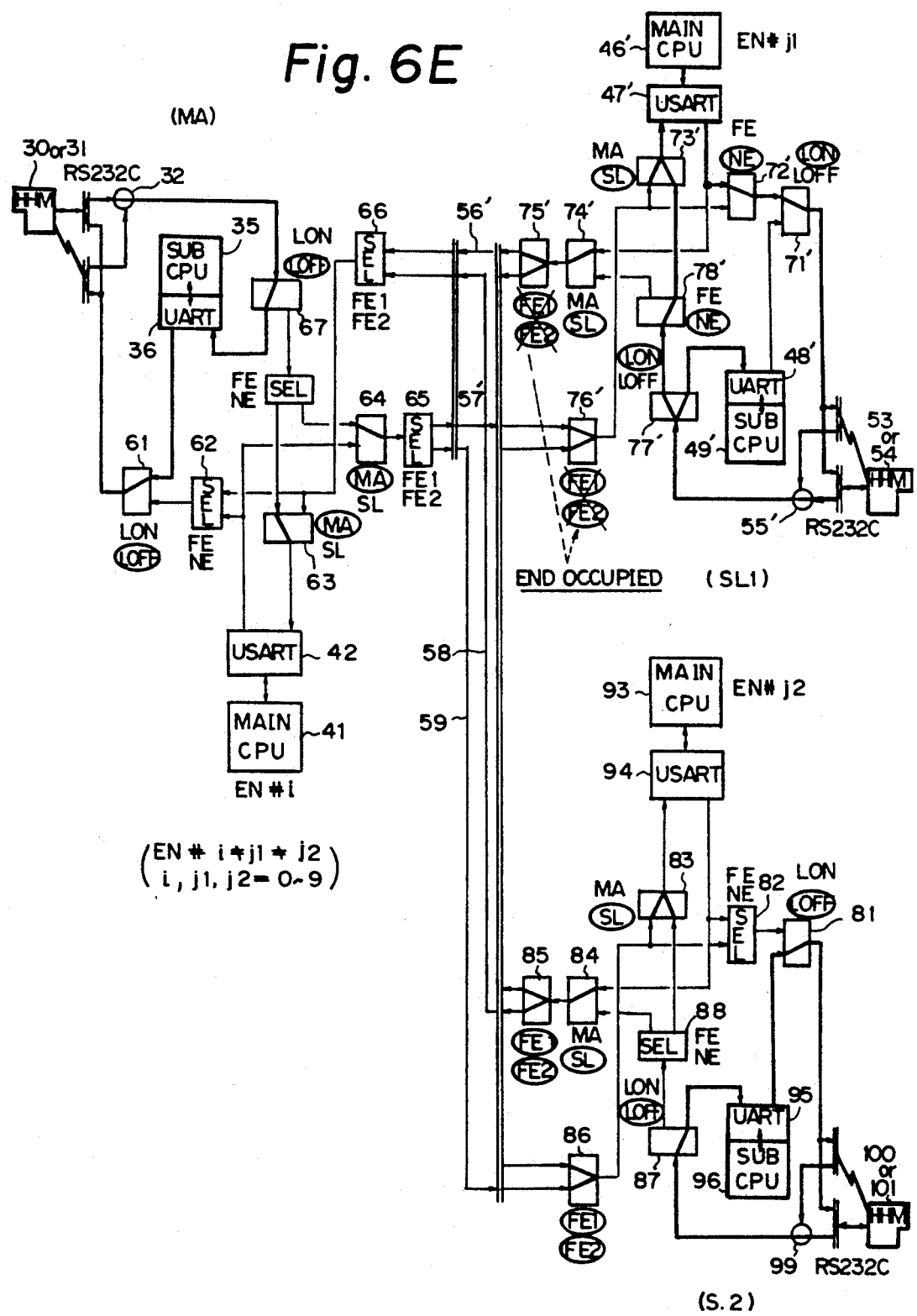

FIGS. 6A to 6F are diagrams showing possible paths for transmitting the management information between three nodes in various selection modes in the second embodiment, wherein one node element in the network is designated as the master node, and two other node elements in the network are designated as the slave node. In FIGS. 6A to 6F, the above paths are shown by bold lines. FIG. 6A shows a connection in the log-off (LOFF) state; FIG. 6B shows a connection in the state in which the terminal device 30 or 31 which is connected to the network routing processor 33 in the master-side node, accesses the master-side node element (the main CPU 41) to which the terminal device is connected; FIG. 6C shows a connection in the state in which the terminal device 30 or 31 which is connected to the network routing processor 33 in the master-side node, accesses the first slave-side (remote) node element (the main CPU 46') through the paths 57' and 56'; FIG. 6D shows a connection in the state in which the terminal device 30 or 31 which is connected to the network routing processor 33 in the master-side node, accesses the second slave-side (remote) node element (the main CPU 93) through the paths 59 and 58; FIG. 6E shows a connection in the state in which the terminal device 53' or 54' which is connected to the network routing processor 52' in the first slave-side node, accesses the first slave-side (remote) node element (the main CPU 46'); and FIG. 6F shows a connection in the state in which the terminal device 100 or 101 which is connected to the network routing processor 98 in the second slave-side node, accesses the second slave-side (remote) node element (the main CPU 93). In the state of FIGS. 6E and 6F, the terminal device 53' or 54' controls the network routing processor 52' in the node element to which the terminal device is connected, and the terminal device 100 or 101 controls the network routing processor 98 in the node element to which the terminal device is connected, in the same manner as the terminal device 30 or 31 does in the case of FIG. 6B, except that the sub-CPU 49' makes the selector 75' output no signal to the master-side node element, and makes the selector 76' receive no signal from the master-side node element, in the case of FIG. 6E, and the sub-CPU 96 makes the selector 85 output no signal to the master-side node element, and makes the selector 86 receive no signal from the master-side node element, in the case of FIG. 6F. The above control of the selectors 75', 76', 85 and 86 are shown in an "END OCCUPIED" state in FIGS. 6E and 6F.

(4) Third Embodiment

FIG. 7 is a diagram showing the construction relating to an access operation from a terminal device which is connected to a node element which is designated as a master-side node, to another remote node element which is designated as a slave-side node, in the third embodiment. In FIG. 7, reference numeral 33 denotes a network routing processor in the master-side node element, and 52" denotes a network routing processor in the slave-side node element, and the construction in each node element in FIG. 7 is the same as the construction shown in FIGS. 3 and 5. Further, reference numerals 121 and 122 respectively denote first and second communication paths from the network routing processor 52" to the network routing processor 33, and reference numerals 122 and 124 respectively denote first and second communication paths from the network routing processor 33 to the network routing processor 52". In the construction of FIG. 7, The aforementioned far-end access path selection mode (FE1/FE2) is used to access one of the above first and second communication paths in the embodiment of FIG. 7.

Figure 8A:
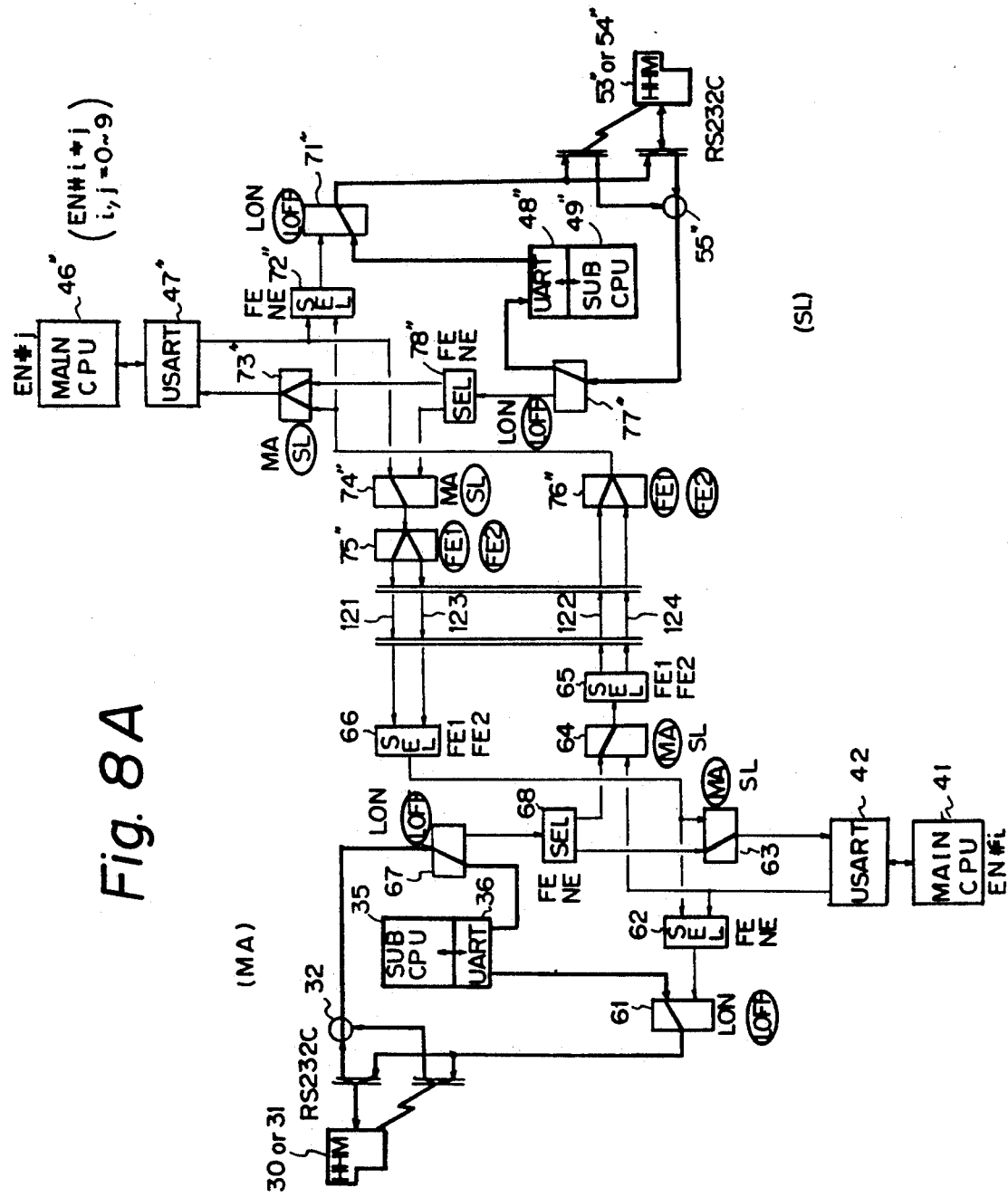
FIGS. 8A to 8E are diagrams showing possible paths for transmitting the management information between the two nodes in various selection modes, in the third embodiment.
Figure 8B:
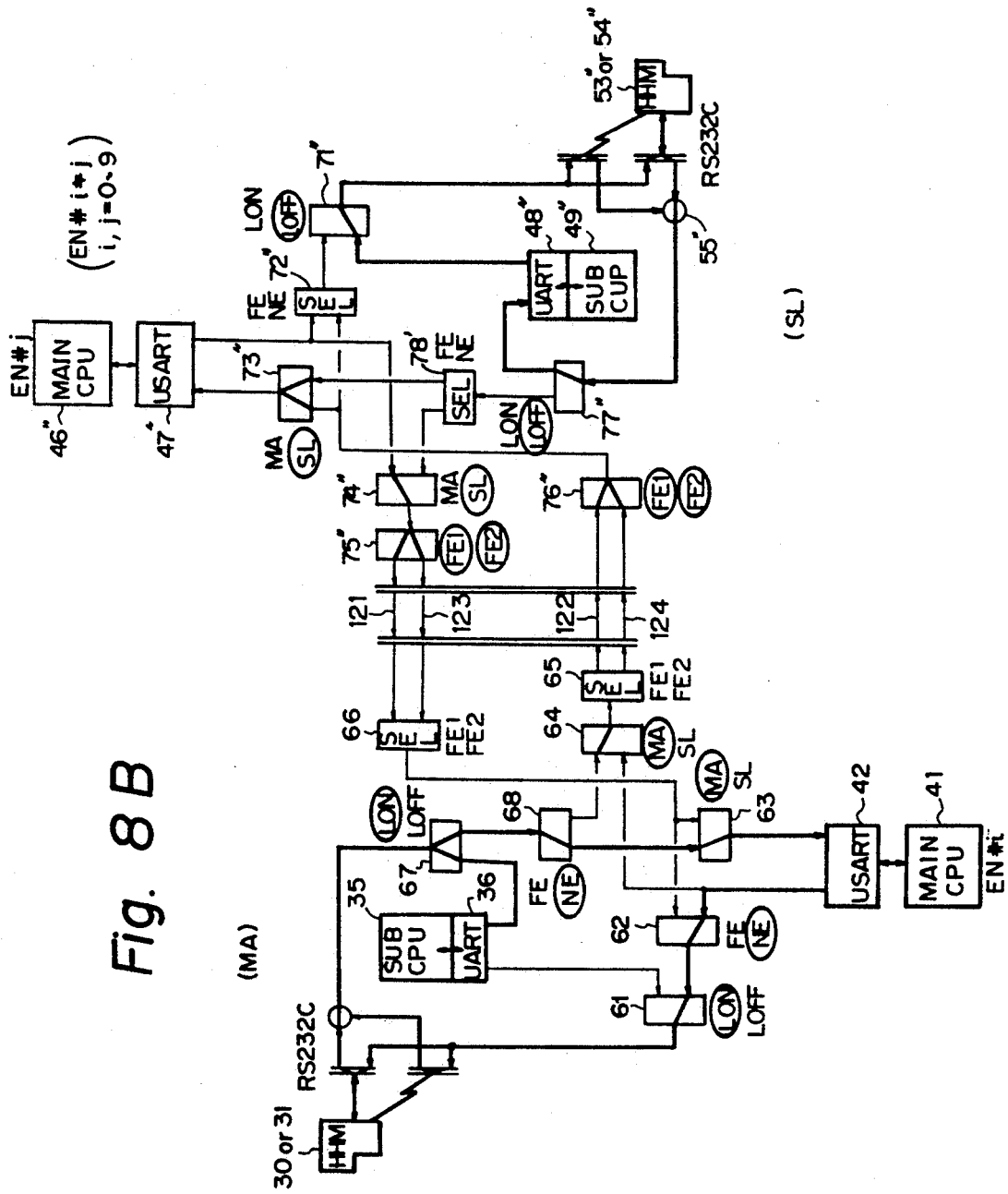
Figure 8C:
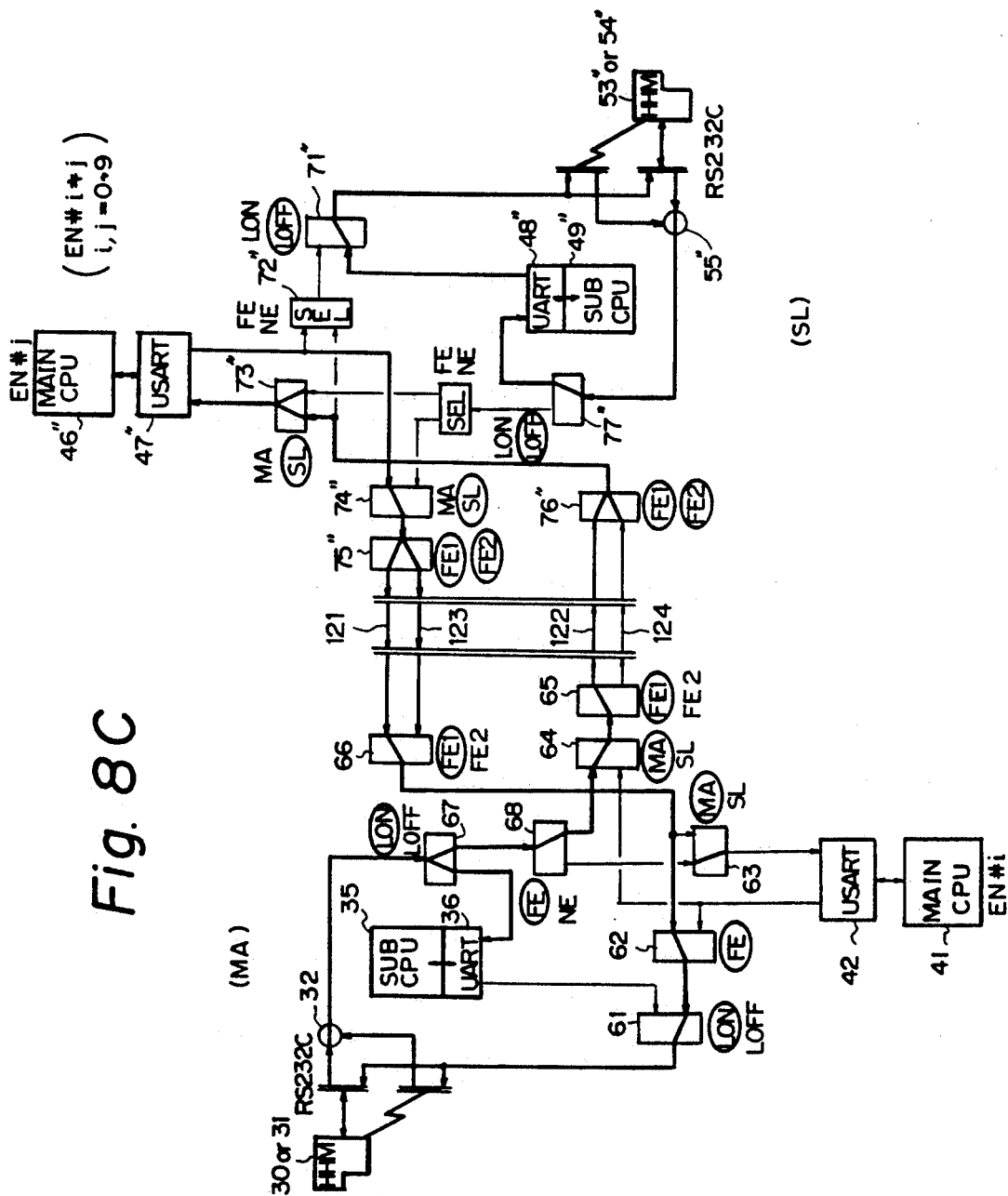
Figure 8D:
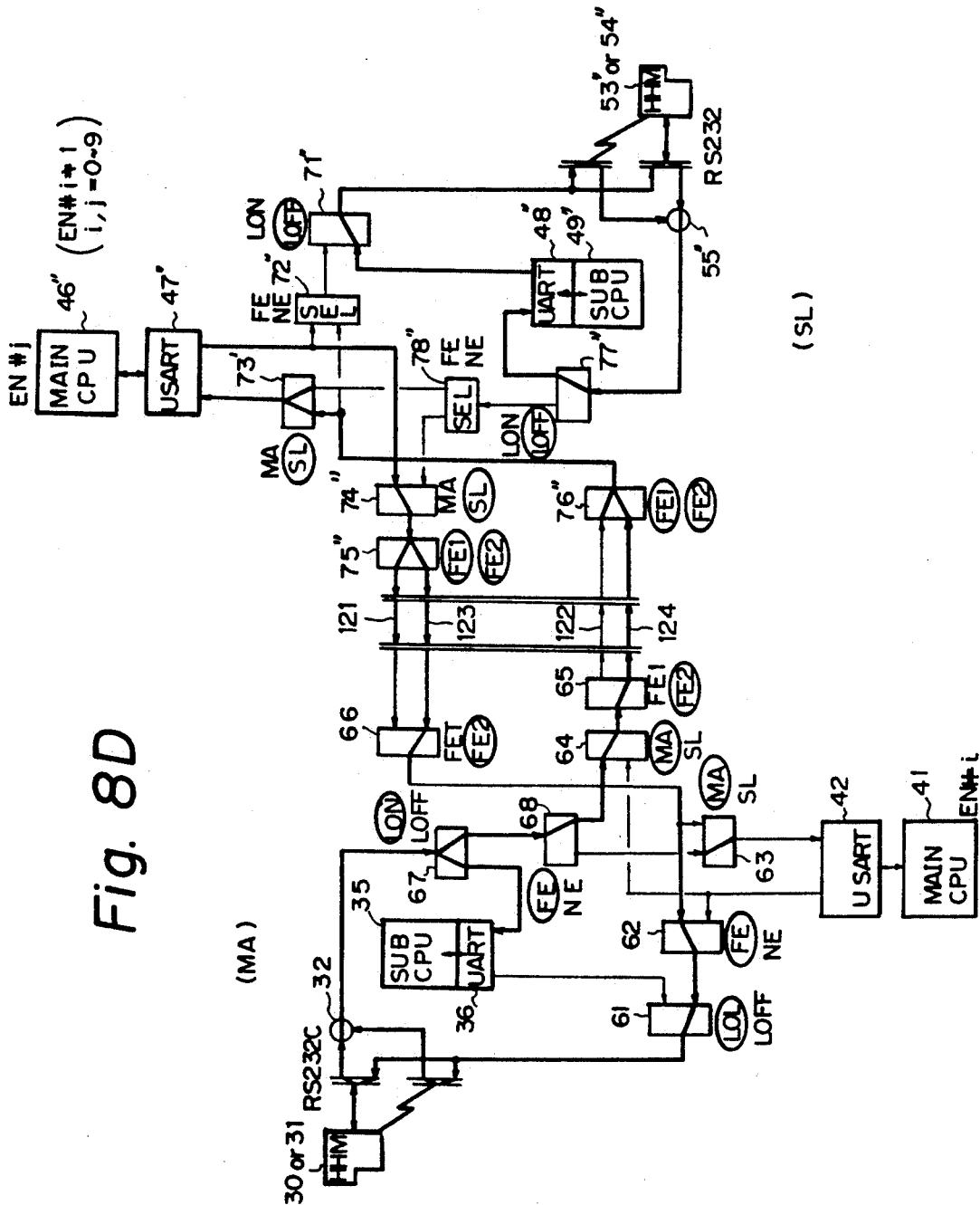
Figure 8E:
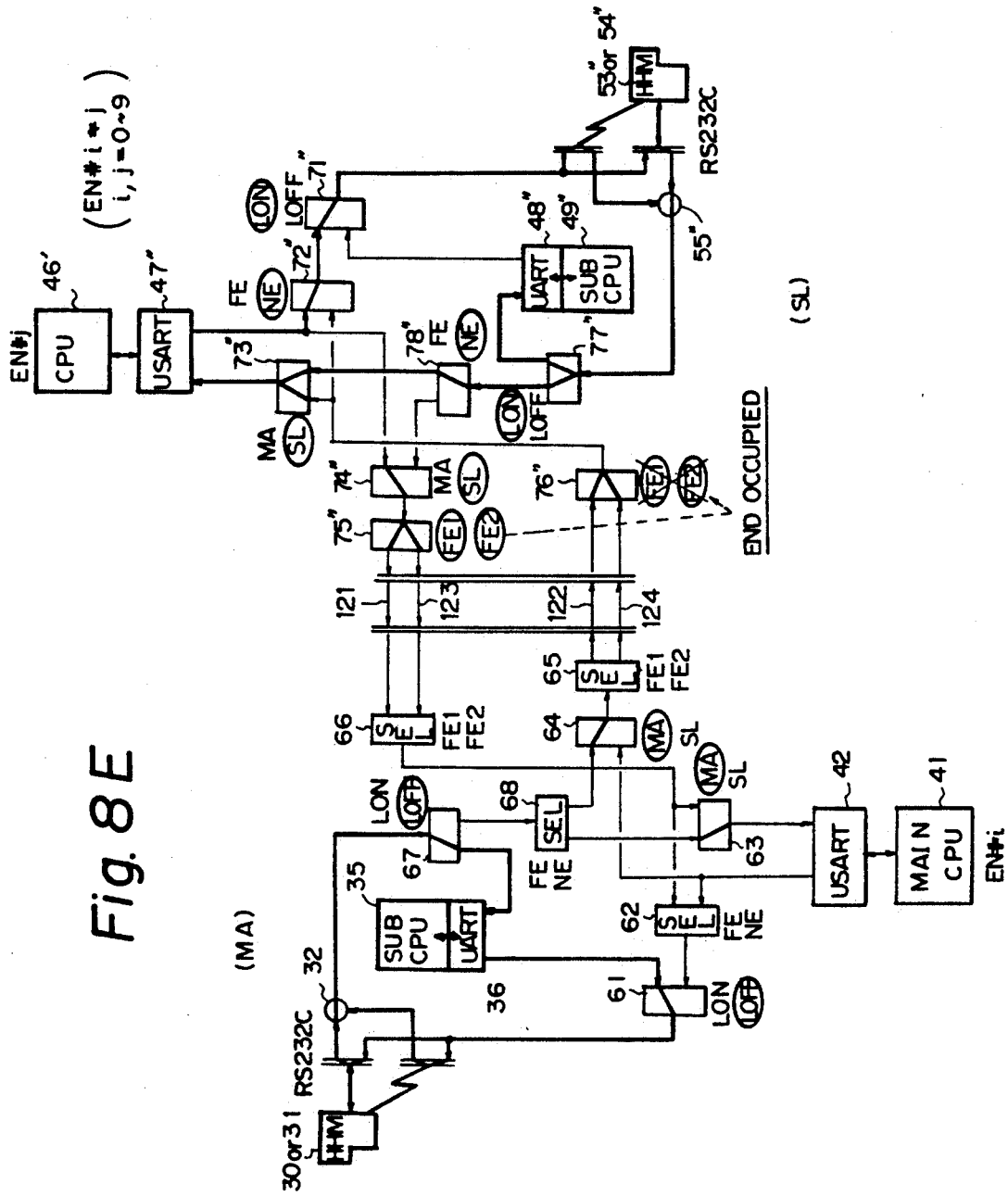

FIGS. 8A to 8E are diagrams showing possible paths for transmitting the management information between the two nodes in various selection modes in the third embodiment, wherein one node element is designated as the master node, and the other node element is designated as the slave node. In FIGS. 8A to 8E, the above paths are shown by bold lines. FIG. 8A shows a connection in the log-off (LOFF) state; FIG. 8B shows a connection in the state in which the terminal device 30 or 31 which is connected to the network routing processor 33 in the master-side node, accesses the master-side node element (the main CPU 41) to which the terminal device is connected; FIG. 8C shows a connection in the state in which the terminal device 30 or 31 which is connected to the network routing processor 33 in the master-side node, accesses the slave-side (remote) node element (the main CPU 46") through the first communication paths 122 and 121; FIG. 8D shows a connection in the state in which the terminal device 30 or 31 which is connected to the network routing processor 33 in the master-side node, accesses the slave-side (remote) node element (the main CPU 46") through the second communication paths 123 and 124; and FIG. 8E shows a connection in the state in which the terminal device 53" or 54" which is connected to the network routing processor 52" in the slave-side node, accesses the slave-side (remote) node element (the main CPU 46"). In the state of FIG. 8E, the terminal device 53" or 54" controls the network routing processor 52" in the node element to which the terminal device is connected, in the same manner as the terminal device 30 or 31 does in the case of FIG. 8B, except that the sub-CPU 49" makes the selector 75" output no signal to the master-side node element, and makes the selector 76" receive no signal from the master-side node element. The above control of the selectors 75" and 76" are shown in an "END OCCUPIED" state in FIG. 8E.

In all the above embodiments, the accesses are made in one direction only. However, when another construction similar to the above is provided for accesses in the other (opposite) direction, accesses in both directions can be performed. In this case, a priority level may be provided for each operation interface processor 14 (the main CPU) in each node element to avoid a conflict, and an access from a node of a higher priority takes precedence over an access from a node of a lower priority at each sub-CPU in each network routing processor.

I claim:

1. A communication system comprising:
   a plurality of node elements; and
   at least one transmission line, connecting said node elements with each other for transmitting time-division multiplexed signals therebetween, where said time-division multiplexed signal contains at least one overhead channel;
      each of said node elements comprising main communication means, connected to said transmission line, transmitting and receiving said time-division multiplexed signals including an overhead channel, containing a multiplexer/demultiplexer means having an overhead signal input/output port for inserting a first overhead signal generated in said each node element which contains said each node element into said overhead channel and dropping down a second overhead signal transmitted from one of the plurality of node elements other than said each node element which contains said each node element from said overhead channel;
   management control means for monitoring first information on a status of said main communication means, holding said first information and second information for controlling the main communication means, and controlling the operation of said main communication means based on the first and second information;
   data input/output terminal means for accessing said management control means in said each node element which contains the data input/output terminal means by outputting a first command, and for accessing said management control means in one of the plurality of node elements other than said each node element which contains the data input/output terminal means by outputting second and third commands;
   switch means, having first, second, and third contacts, where said first contact is connected to said management control means, said second contact is connected to said data input/output terminal means, said third contact is connected to said overhead signal input/output port in said multiplexer/demultiplexer means, and communication control means, operatively connected to said data input/output terminal means in said each node element which contains the communication control means, and to said overhead signal input/output port in said multiplexer/demultiplexer means, for receiving said first or second command from said data input/output terminal means in said each node element which contains the communication control means, and receiving said third command from one of said plurality of node elements other than said each node element which contains the communication control means through said overhead signal input/output port as said second overhead signal, and controlling said switch means so that said first contact is connected to said second contact when receiving the first command from said data input/output terminal means in said each node element which contains the communication control means, said second contact is connected to said third contact when receiving the second command from said data input/output terminal means in said each node element which contains the communication control means, and said first contact is connected to said third contact when receiving the third command from one of the plurality of node elements other than said each node element which contains the communication control means, where said third command received by said communication control means is transmitted through said overhead channel from said one of the plurality of node elements other than said each node element which contains the communication control means, and in said one of the plurality of node elements, the third command is output from the data input/output terminal means, and transferred through the switch means to the overhead signal input/output port in said one of the plurality of node elements.

2. A communication system according to claim 1, wherein said management control means comprising:
memory means for storing said first and second information, and
interface processing means for receiving requests from said data input/output terminal means in said each node element and one of the plurality of node elements other than said each node element through said switch means for reading and rewriting said first and second information stored in the memory means, and said interface processing means reading and rewriting said first and second information stored in the memory means according to the requests; and
said data input/output terminal means further outputting said requests.

3. A communication system according to claim 1, wherein said communication control means further comprises priority storing means for storing priority levels for the plurality of node elements, and
priority determining means for determining, when receiving said second command from one of the plurality of node elements other than said each node element, whether or not the priority level of said one of the plurality of node elements is higher than the priority level of said each node element;
said communication control means controls said switch means according to said second command only when the priority level of said one of the plurality of node elements is higher than the priority level of said each node element.

4. A communication system according to claim 3, wherein said management control means comprising:
memory means for storing said first and second information, and
interface processing means for receiving requests from said terminal information input/output port means in said each node element and one of the plurality of node elements other than said each node element through said switch means for reading and rewriting said first and second information stored in the memory means, and said interface processing means reading and rewriting said first and second information stored in the memory means according to the requests; and
said terminal information input/output port means further outputting said requests.

5. A communication system comprising:
a plurality of node elements; and
at least one transmission line, connecting said node elements with each other for transmitting time-division multiplexed signals therebetween, where said time-division multiplexed signal contains at least one overhead channel;
each of said node elements comprising main communication means, connected to said transmission line, transmitting and receiving said time-division multiplexed signals including an overhead channel, containing a multiplexer/dimultiplexer means having an overhead signal input/output port for inserting a first overhead signal from said each node element which contains said each node elements into said overhead channel and dropping down a second overhead signal generated in one of the plurality of node elements other than said each node elements which contains said each node element from said overhead channel;
management control means for monitoring first information on a status of said main communication means, holding said first information and second information for controlling the main communication means, and controlling the operation of said main communication means based on the first and second information;
terminal information input/output port means for inputting a first command requesting provision of a first linkpath from the terminal information input/output port means in said each node element to said management control means and a second command requesting provision of a second linkpath from the terminal information input/output port means in one of the plurality of node elements other than said each node element to said management control means, inputting information to be transferred to the management control means, and outputting information obtained from the management control means;
switch means, having first, second, and third contacts, where said first contact is connected to said management control means, said second contact is connected to said terminal information input/output port means, said third contact is connected to said overhead signal input/output port in said multiplexer/demultiplexer means, and
communication control means, operatively connected to said terminal information input/output port means in said each node element which contains the communication control means, and to said overhead signal input/output port in said multiplexer/demultiplexer means, for receiving said first or second command from said terminal information input/output port means in said each node element which contains the communication control means, and receiving said second command from one of said plurality of node elements other than said each node element which contains the communication control means through said overhead signal input/output port as said second overhead signal, and controlling said switch means so that said first contract is connected to said second contact when receiving the first command from said terminal information input/output port means in said each node element which contains the communication control means, said second contact is connected to said third contact when receiving the second command from said terminal information input/output port means in said each node element which contains the communication control means, and said first contact is connected to said third contact when receiving the second command from one of the plurality of node elements other than said each node element which contains the communication control means, wherein said third command received by said communication control means is transmitted through said overhead channel from said one of the plurality of node elements other than said each node element which contains the communication control means, and in said one of the plurality of node elements, the third command is output from the data input/output terminal means, and transferred through the switch means to the overhead signal input/output port in said one of the plurality of node elements.

6. A communication system according to claim 5, wherein said communication control means further comprises priority storing means for storing priority levels for the plurality of node elements, and priority determining means for determining, when receiving said second command from one of the plurality of node elements other than said each node element, whether or not the priority level of said one of the plurality of node elements is higher than the priority level of said each node element;

said communication control means controls said switch means according to said second command only when the priority level of said one of the plurality of node elements is higher than the priority level of said each node element.

7. A communication apparatus comprising:

main communication means for transmitting and receiving time-division multiplexed signals, containing multiplexer/demultiplexer means having an overhead signal input/output port for inserting a first overhead signal from said communication apparatus which contains said communication apparatus into said overhead channel and dropping down a second overhead signal from said overhead channel;

management control means for monitoring first information on a status of said main communication means, holding said first information and second information for controlling the main communication means, and controlling the operation of said main communication means based on the first and second information;

terminal information input/output port means for inputting a first command requesting provision of a first linkpath from the terminal information input/output port means in said communication apparatus to said management control means and a second command requesting provision of a second linkpath from said overhead input/output port to said management control means, inputting information to be transferred to the management control means, and outputting information obtained from the management control means;

switch means, having first, second, and third contacts, where said first contact is connected to said management control means, said second contact is connected to said terminal information input/output port means, said third contact is connected to said overhead signal input/output port in said multiplexer/demultiplexer means, and communication control means, operatively connected to said terminal information input/output port means in said communication apparatus, and to said overhead signal input/output port in said multiplexer/demultiplexer means, for receiving said first or second command from said terminal information input/output port means in said communication apparatus, and receiving a third command through said overhead signal input/output port as said second overhead signal, and controlling said switch means so that said first contact is connected to said second contact when receiving the first command from said terminal information input/output port means in said communication apparatus, said second contact is connected to said third contact when receiving the second command from said terminal information input/output port means in said communication apparatus, and said first contact is connected to said third contact when receiving the third command from said overhead signal input/output port.

8. A communication apparatus according to claim 7, wherein said management control means comprising:

memory means for storing said first and second information, and interface processing means for receiving requests from said terminal information input/output port means in said communication apparatus and from said overhead signal input/output port for reading and rewriting said first and second information stored in the memory means, and said interface processing means reading and rewriting said first and second information stored in the memory means according to the requests; and said terminal information input/output port means further outputting said requests.

* * * * *